US009817303B2

(12) United States Patent
Takagi et al.

(10) Patent No.: US 9,817,303 B2
(45) Date of Patent: Nov. 14, 2017

(54) LIGHT SOURCE DEVICE, ILLUMINATION DEVICE AND PROJECTOR

(71) Applicant: Seiko Epson Corporation, Tokyo (JP)

(72) Inventors: Kunihiko Takagi, Okaya (JP); Makoto Zakoji, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/379,020

(22) Filed: Dec. 14, 2016

(65) Prior Publication Data

US 2017/0184949 A1 Jun. 29, 2017

(30) Foreign Application Priority Data

Dec. 29, 2015 (JP) ................. 2015-257670

(51) Int. Cl.
| | |
|---|---|
| G03B 21/16 | (2006.01) |
| F21V 29/76 | (2015.01) |
| F21V 29/65 | (2015.01) |
| F21V 29/67 | (2015.01) |
| F21V 29/83 | (2015.01) |
| G03B 21/20 | (2006.01) |

(52) U.S. Cl.
CPC .............. *G03B 21/16* (2013.01); *F21V 29/65* (2015.01); *F21V 29/673* (2015.01); *F21V 29/76* (2015.01); *F21V 29/83* (2015.01); *G03B 21/2013* (2013.01); *G03B 21/2033* (2013.01)

(58) Field of Classification Search
CPC .... G03B 21/14; G03B 21/16; G03B 21/2013; H01S 5/02; H01S 5/02212; H01S 5/02469; H04N 9/3144; H04N 9/3161
See application file for complete search history.

(56) References Cited

U.S. PATENT DOCUMENTS

| 7,815,315 | B2 * | 10/2010 | Momose | ................. F25B 21/02 353/52 |
|---|---|---|---|---|
| 8,128,236 | B2 * | 3/2012 | Kim | ...................... G03B 21/16 353/52 |
| 8,226,244 | B2 * | 7/2012 | Yamagishi | ............. G03B 21/16 353/119 |
| 2014/0362350 | A1 | 12/2014 | Takamatsu | |

FOREIGN PATENT DOCUMENTS

JP 2014-238485 A 12/2014

* cited by examiner

*Primary Examiner* — Sultan Chowdhury
(74) *Attorney, Agent, or Firm* — ALG Intellectual Property, LLC

(57) ABSTRACT

The heat dissipation portion includes a plurality of plate-like bodies that extend out along a plane which is specified by a first direction and a second direction intersecting the first direction, and are disposed facing each other in a third direction intersecting the first direction and the second direction, a connecting portion which is located on the second direction side in the plurality of plate-like bodies, and is connected to the heat receiving portion, an opening which is located on an opposite side to the second direction in the heat dissipation portion, and a position corresponding to the connecting portion, and a shielding portion which is located on an opposite side to the second direction in the heat dissipation portion, and in the periphery of the opening.

10 Claims, 11 Drawing Sheets

LIGHT SOURCE DEVICE, ILLUMINATION DEVICE AND PROJECTOR

CROSS-REFERENCE TO RELATED APPLICATION

The entire disclosure of Japanese Patent Application No. 2015-257670, filed Dec. 29, 2015 is expressly incorporated by reference herein.

BACKGROUND

1. Technical Field

The present invention relates to a light source device, an illumination device and a projector.

2. Related Art

Hitherto, there has been known a projector which includes a light source device, a light modulating device that modulates light emitted from the light source device to form an image based on image information, and a projection optical device that extendedly projects the formed image onto a projection surface such as a screen. As a light source device used in such a projector, a light source device has been known which synthesizes laser light of a blue wavelength region and light of a red wavelength region to a green wavelength region which is generated from a fluorescent substance excited by the laser light, and emits white light (see, for example, JP-A-2014-238485).

The light source device disclosed in JP-A-2014-238485 includes a housing portion, and two light source portions and one phosphor unit which are held by the housing portion. Among these components, the light source portion includes one or more solid-state light sources, and the phosphor unit receives light from the light source portions to generate and emit white light.

In such a light source device, a heat sink is provided on the rear side of each of the light source portions.

Incidentally, in the solid-state light source, a continuance of a high-temperature state while heat is generated on its lighting causes a reduction in life span, and thus appropriate cooling is required.

However, in the light source device disclosed in JP-A-2014-238485, when cooling gas is sent out to the surface of a heat sink on the rear side, the heat sink being disposed on the rear side (opposite side to the light emitting side) of the light source portion having one or more solid-state light sources, only a portion of the cooling gas circulates to the light source portion, and the other cooling gas is discharged through between fins without circulating to the light source portion. For this reason, there is a problem in that the cooling efficiency of the light source portion is not high.

SUMMARY

An advantage of some aspects of the invention is to provide a light source device, an illumination device and a projector which are capable of efficiently cooling a light source portion.

A light source device according to a first aspect of the invention includes: a light source portion that emits light; a heat receiving portion that receives heat generated in the light source portion; and a heat dissipation portion that dissipates heat conducted from the heat receiving portion, wherein the heat dissipation portion includes a plurality of plate-like bodies that extend out along a plane which is specified by a first direction and a second direction intersecting the first direction, and are disposed facing each other in a third direction intersecting the first direction and the second direction, a connecting portion which is located on the second direction side in the plurality of plate-like bodies, and is connected to the heat receiving portion, an opening which is located on an opposite side to the second direction in the heat dissipation portion, and a position corresponding to the connecting portion, and a shielding portion which is located on an opposite side to the second direction in the heat dissipation portion, and in the periphery of the opening.

Examples of such a light source portion capable of being exemplified include a configuration having a solid-state light source such as a laser diode (LD) or a light emitting diode (LED), and a configuration having a light source lamp such as a super high-pressure mercury lamp.

According to the first aspect, in a case where a cooling gas is sent to the heat dissipation portion along the second direction, the cooling gas is shielded by the shielding portion and is introduced from the opening into the heat dissipation portion. This cooling gas is sent between the plurality of plate-like bodies in the second direction, but the opening is located at a position corresponding to the connecting portion which is connected to the heat receiving portion. Therefore, the cooling gas sent between the plurality of plate-like bodies in the second direction is sent to the connecting portion having an increase in temperature due to heat being conducted from the heat receiving portion, at a shortest distance. According to this, it is possible to efficiently cool the connecting portion by sending the cooling gas. Therefore, since the cooling gas can be guided to the opening by the shielding portion, and the cooling gas can thereby be reliably and effectively sent to the connecting portion, it is possible to efficiently cool the heat receiving portion and the light source portion. In addition, since the light source portion is cooled in this manner, it is possible to achieve an increase in the life spans of the light source portion and the light source device.

In the first aspect, it is preferable that a cooling gas sent into the heat dissipation portion through the opening is sent between the plurality of plate-like bodies along the second direction.

According to such a configuration, as described above, the cooling gas sent into the heat dissipation portion through the opening is sent along the second direction, and thus it is possible to reliably send the cooling gas to the connecting portion. Therefore, it is possible to reliably efficiently cool the heat receiving portion and the light source portion.

In the first aspect, it is preferable that the shielding portion is located on at least any of a site on the first direction side in a surface of the heat dissipation portion on the opposite side to the second direction and a site on an opposite side to the first direction.

According to such a configuration, it is possible to increase a flow channel in which the cooling gas introduced into the heat dissipation portion through the opening and having cooled the connecting portion is sent through between the respective plate-like bodies in the first direction and an opposite direction to the first direction. Therefore, it is possible to efficiently cool the plurality of plate-like bodies to which heat is conducted from the connecting portion.

In the first aspect, it is preferable that a dimension of the opening in the first direction is equal to or less than a dimension of the connecting portion in the first direction.

Here, in a case where the dimension of the opening in the first direction is larger than the dimension of the connecting portion to which heat is conducted from the heat receiving portion in the first direction, a cooling gas which is not sent the connecting portion has a tendency to occur, and the cooling efficiency of the connecting portion decreases.

On the other hand, according to the above configuration, it is possible to reliably send the substantial entirety of the cooling gas introduced from the opening to the connecting portion. Therefore, it is possible to increase the flow rate of the cooling gas sent to the connecting portion, and to further increase the cooling efficiency of the heat receiving portion and the light source portion.

In the first aspect, it is preferable that the heat dissipation portion includes a discharge portion that discharges a cooling gas, to an outside, which is sent to at least any of the first direction side and the opposite side to the first direction with respect to the connecting portion.

According to such a configuration, the cooling gas introduced through the opening is sent to the connecting portion, and then is sent to the first direction side of the connecting portion or the opposite side to the first direction through between the plurality of plate-like bodies and is discharged from the discharge portion. According to this, the cooling gas having cooled the connecting portion can be sent to at least any of the first direction side and the opposite side to the first direction without delay. Therefore, since the cooling gas can be reliably sent between the respective plate-like bodies, it is possible to improve the cooling efficiency of these plate-like bodies, and the cooling efficiency of the heat receiving portion and the light source portion. Besides, the cooling gas is sent without delay, and thus it is possible to increase the flow rate of the cooling gas. Therefore, in this point, it is also possible to improve the cooling efficiency of heat which is conducted through the connecting portion, and to improve the cooling efficiency of the heat receiving portion and the light source portion.

In the first aspect, it is preferable that the discharge portion is located on the same surface as a surface of the heat dissipation portion on which the connecting portion is located.

According to such a configuration, for example, in a case where the duct is connected to the discharge portion, it is possible to suppress an increase in the dimension of the illumination device including the light source device and the duct in the first direction.

In the first aspect, it is preferable that the discharge portions are located at an end face of the heat dissipation portion on the first direction side and an end face thereof on the opposite side to the first direction, respectively.

According to such a configuration, it is possible to send the cooling gas to the entire surfaces of the respective plate-like bodies in the first direction. Therefore, it is possible to improve the cooling efficiency of each of the plate-like bodies, and to improve the cooling efficiency of the heat receiving portion and the light source portion.

An illumination device according to a second aspect of the invention includes: the light source device; a duct in which at least any of a cooling gas sent to the heat dissipation portion and a cooling gas having cooled the heat dissipation portion is sent thereinto; a fan, provided in the duct, which sends a cooling gas to the heat dissipation portion; and a plurality of optical components that act on light emitted from the light source device.

According to the second aspect, it is possible to exhibit the same effect as that of the light source device according to the first aspect. In addition, the cooling gas can be reliably sent to the heat dissipation portion by the fan.

In the second aspect, it is preferable to include two light source devices; and a photosynthesis member that synthesizes beams of light emitted from the two light source devices.

According to such a configuration, beams of light emitted from the two light source devices and synthesized by the photosynthesis member are emitted from the illumination device. Thereby, it is possible to increase the amount of light to be emitted, as compared to an illumination device having one light source device adopted therein.

A projector according to a third aspect of the includes: the illumination device; a light modulating device that modulates light emitted from the illumination device; and a projection optical device that projects light modulated by the light modulating device.

According to the third aspect, since it is possible to exhibit the same effect as that of the illumination device according to the second aspect, it is possible to constitute a projector capable of stably projecting an image.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
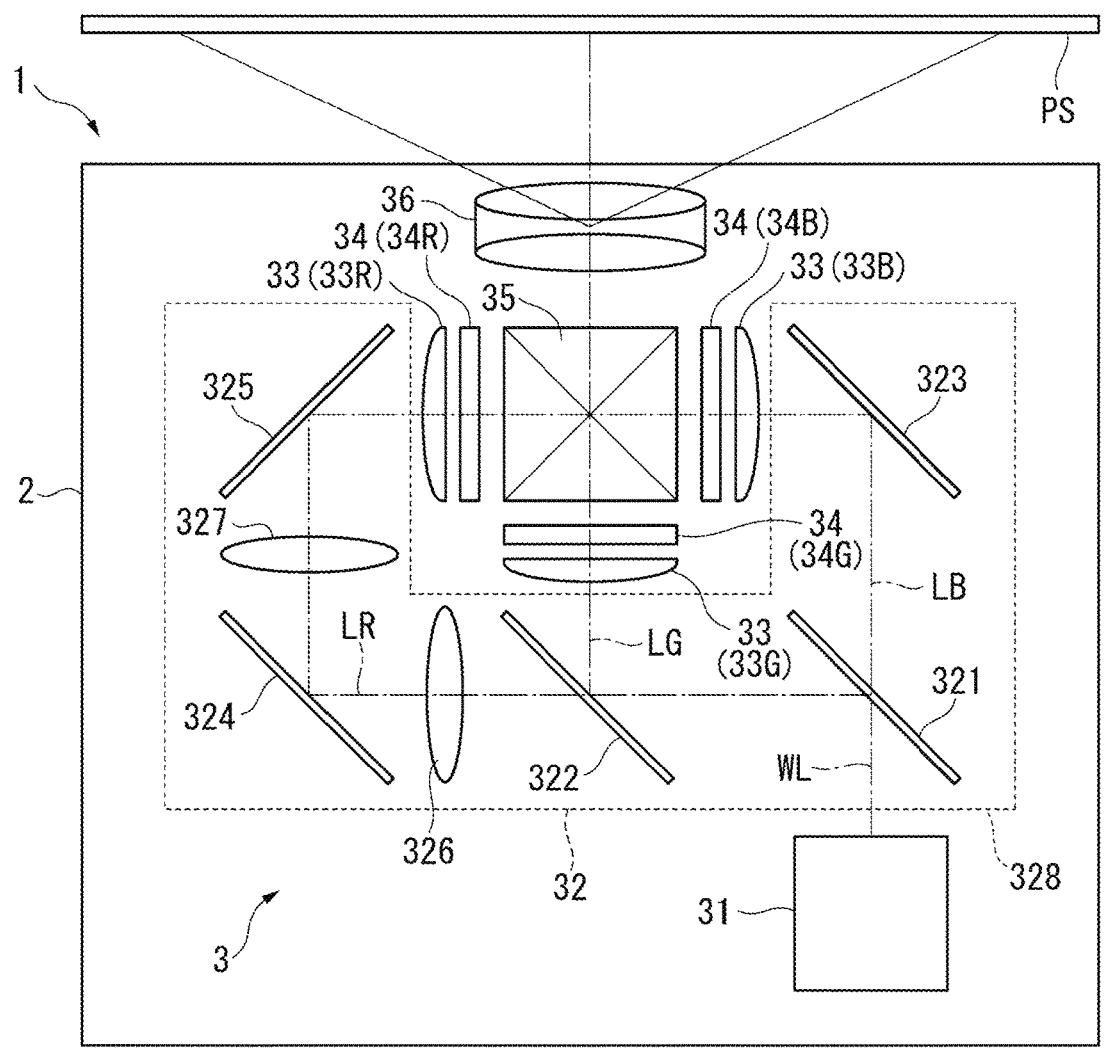
FIG. 1 is a schematic diagram illustrating a configuration of a projector according to a first embodiment of the invention.

Hereinafter, a first embodiment of the invention will be described with reference to the accompanying drawings.
Schematic Configuration of Projector FIG. 1 is a schematic diagram illustrating a configuration of a projector 1 according to the present embodiment.

The projector 1 according to the present embodiment is a projection-type display device that modulates light emitted from a uniform illumination device 31 described later to form an image based on image information, and extendedly projects the image onto a projection surface PS such as a screen. As shown in FIG. 1, this projector 1 includes an exterior housing 2 constituting an exterior package, and an image projection device 3 which is received within the exterior housing 2. Besides, though not shown in the drawing, the projector 1 includes a control device that controls the projector 1 and a power supply device that supplies power to electronic parts, in addition to a cooling device that cools a heating element.

Such a projector 1 has one feature in that the projector includes a light source device 5 and an illumination device 4 which are capable of efficiently cooling a light source portion 51 described later.

Configuration of Image Projection Device

The image projection device 3 forms and projects the image. This image projection device 3 includes a uniform illumination device 31, a color separation device 32, collimating lenses 33, light modulating devices 34, a color synthesizing device 35 and a projection optical device 36.

Among these components, the uniform illumination device 31 emits white illumination light WL with which the light modulating device 34 is uniformly illuminated. The configuration of the uniform illumination device 31 will be described later in detail.

The color separation device 32 separates the illumination light WL incident from the uniform illumination device 31 into red, green and blue beams of colored light LR, LG, and LB. This color separation device 32 includes dichroic mirrors 321 and 322, reflection mirrors 323, 324, and 325 and relay lenses 326 and 327, and a housing 328 for optical components that houses these components therein.

The dichroic mirror 321 separates the blue light LB and the other colored light (green light LG and red light LR) from the illumination light WL. The separated blue light LB is reflected by the reflection mirror 323, and is guided to the collimating lens 33 (33B).

The dichroic mirror 322 separates the green light LG and the red light LR from the other separated colored light. The separated green light LG is guided to the collimating lens 33 (33G). In addition, the separated red light LR is guided to the collimating lens 33 (33R) through the relay lens 326, the reflection mirror 324, the relay lens 327 and the reflection mirror 325.

The collimating lenses 33 (collimating lenses for respective beams of colored light of red, green and blue are set to 33R, 33G, and 33B, respectively) collimate incident light.

The light modulating devices 34 (light modulating devices for respective beams of colored light of red, green and blue are set to 34R, 34G, and 34B, respectively) modulate the respective incident beams of colored light LR, LG, and LB, and form image light based on the respective beams of colored light LR, LG, and LB according to image information. Each of these light modulating devices 34 are configured to include, for example, a liquid crystal panel that modulates incident light, and a pair of polarizing plates which are disposed on the incident side and the emission side of the liquid crystal panel.

The color synthesizing device 35 synthesizes beams of image light of the respective beams of colored light LR, LG, and LB which are incident from the respective light modulating devices 34R, 34G, and 34B. In the present embodiment, such a color synthesizing device 35 is constituted by a cross dichroic prism.

The projection optical device 36 extendedly projects the image light synthesized by the color synthesizing device 35 onto the projection surface PS. An example of such a projection optical device 36 capable of being adopted includes an assembled lens which is constituted by a lens barrel and a plurality of lens disposed within the lens barrel.

Configuration of Uniform Illumination Device

Figure 2:
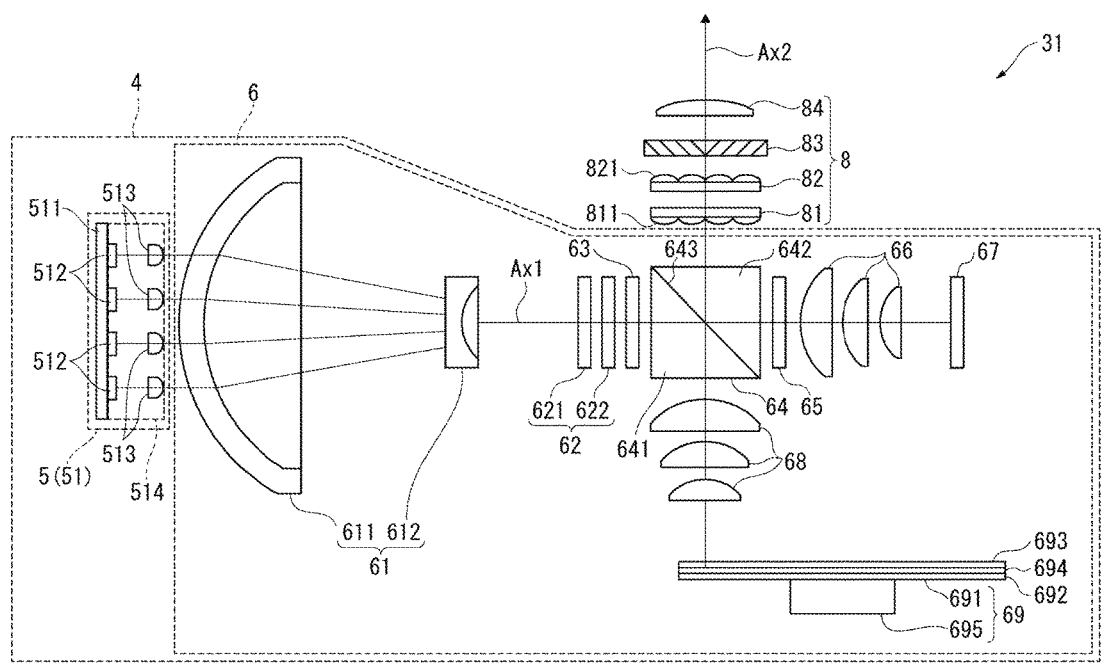
FIG. 2 is a schematic diagram illustrating a configuration of a uniform illumination device in the first embodiment.

FIG. 2 is a schematic diagram illustrating a configuration of the uniform illumination device 31.

As described above, the uniform illumination device 31 emits the white illumination light WL toward the color separation device 32. As shown in FIG. 2, this uniform illumination device 31 includes the illumination device 4 and a uniformizing device 8, and the illumination device 4 includes the light source device 5, an illumination light generation device 6, and a light source cooling device 7 (see FIGS. 5 and 6) which is described later.

Configuration of Light Source Device

The light source device 5 includes a light source portion 51 that emits excitation light.

The light source portion 51 includes a substrate 511, a plurality of solid-state light sources 512 which are laser diodes (LD) and are arranged on the substrate 511, and each collimating lens 513 provided corresponding to each of the solid-state light sources 512, and emits excitation light which is blue light toward the illumination light generation device 6. In the present embodiment, the solid-state light source 512 is an LD that emits excitation light having a peak wavelength of 440 nm. However, as the solid-state light source, an LD that emits excitation light having a peak wavelength of 446 nm may be adopted, and LDs that emit beams of excitation light having peak wavelengths of 440 nm and 446 nm, respectively, may be mixed. The excitation light emitted from these solid-state light sources 512 is collimated by the collimating lens 513 and is incident on the illumination light generation device 6. In the present embodiment, the excitation light emitted from each of the solid-state light sources 512 is S-polarized light.

Besides, though not shown in FIG. 2, the light source device 5 includes a heat receiving portion 52 which is connected to the substrate 511, and a heat dissipation portion 53 which is connected to the heat receiving portion 52. These components will be described later in detail.

Configuration of Illumination Light Generation Device

The illumination light generation device 6 generates illumination light WL which is white light from excitation light incident from the light source device 5, and emits the illumination light WL to the uniformizing device 8. This illumination light generation device 6 includes an afocal optical system 61 and a homogenizer optical system 62 which are equivalent to optical components of the invention, a first retardation element 63, a light separation device 64, a second retardation element 65, a first condensing element 66, a diffusion device 67, a second condensing element 68 and a wavelength conversion device 69.

The light source portion 51 of the light source device 5, the afocal optical system 61, the homogenizer optical system 62, the first retardation element 63, the second retardation element 65, the first condensing element 66 and the diffusion device 67 are disposed on an illumination optical axis Ax1. In addition, the second condensing element 68 and the wavelength conversion device 69 are disposed on an illumination optical axis Ax2 intersecting the illumination optical axis Ax1. The light separation device 64 disposed at the portion of intersection between the illumination optical axis Ax1 and the illumination optical axis Ax2.

The afocal optical system 61 adjusts the diameter of a flux of light of excitation light incident from the light source portion 51. This afocal optical system 61 includes lenses 611 and 612. The excitation light having passed through this afocal optical system 61 is incident on the homogenizer optical system 62.

The homogenizer optical system 62 uniformizes the illuminance distribution of excitation light in respective regions to be illuminated in the diffusion device 67 and the wavelength conversion device 69, in cooperation with the respective condensing elements 66 and 68 described later. This homogenizer optical system 62 includes a pair of multi-lens arrays 621 and 622 which each have a plurality of small lenses arranged in a matrix within a plane intersecting the optical axis. The excitation light emitted from this homogenizer optical system 62 is incident on the first retardation element 63.

The first retardation element 63 is a ½-wavelength plate. This first retardation element 63 converts a portion of the excitation light which is incident S-polarized light into P-polarized light, and emits excitation light obtained by mixing the S-polarized light and the P-polarized light. This excitation light is incident on the light separation device 64.

The light separation device 64 is a prism-type polarizing beam splitter (PBS), and is configured such that prisms 641 and 642 formed in a substantially triangular prism shape are bonded to each other at an interface corresponding to an oblique side. Thereby, the light separation device is formed in a substantially rectangular shape. This interface is inclined by approximately 45° with respect to each of the illumination optical axis Ax1 and the illumination optical axis Ax2. In the light separation device 64, a polarization separation layer 643 is formed at the interface of the prism 641 located on the first retardation element 63 side (that is, light source portion 51 side).

The polarization separation layer 643 has the polarization separation characteristics of wavelength selectivity. Specifically, the polarization separation layer 643 has the characteristics of reflecting one of the S-polarized light and the P-polarized light included in the excitation light, and transmitting the other, to thereby separate these beams of polarized light. In addition, the polarization separation layer 643 has the characteristics of transmitting fluorescent light (light containing green light and red light) generated in the wavelength conversion device 69, regardless of a polarization state.

With such a light separation device 64, in the present embodiment, the P-polarized light included in the excitation light incident from the first retardation element 63 is transmitted to the second retardation element 65 side along the illumination optical axis Ax1, and the S-polarized light included therein is reflected to the second condensing element 68 side along the illumination optical axis Ax2.

The second retardation element 65 which is a ¼-wavelength plate converts excitation light (linearly polarized light) incident from the light separation device 64 into circularly polarized light, and converts excitation light (circularly polarized light) incident from the first condensing element 66 into linearly polarized light.

The first condensing element 66 is an optical element that condenses (focuses) excitation light having passed through the second retardation element 65 to the diffusion device 67, and is constituted by three lenses in the present embodiment. However, the number of lenses constituting the first condensing element 66 is not limited to 3.

The diffusion device 67 diffuses and reflects the incident excitation light at the same diffusion angle as that of the fluorescent light which is generated and emitted by the wavelength conversion device 69. This diffusion device 67 includes a reflective plate that allows Lambertian reflectance of incident light and a rotating device that rotates the reflective plate to perform cooling, which are not shown in the drawing.

The excitation light diffused and reflected by such a diffusion device 67 is incident on the second retardation element 65 again through the first condensing element 66. When reflected by this diffusion device 67, the circularly polarized light incident on the diffusion device 67 becomes reversely circularly polarized light, and is converted into S-polarized excitation light of which the polarization direction is rotated by 90° with respect to P-polarized excitation light incident from the light separation device 64 in the process of passing through the second retardation element 65. The excitation light is reflected by the polarization separation layer 643, and is incident on the uniformizing device 8, as blue light, along the illumination optical axis Ax2. That is, the excitation light diffused and reflected by the diffusion device 67 is emitted by the light separation device 64 in the direction of the illumination optical axis Ax2.

As described above, the second condensing element 68 and the wavelength conversion device 69 are disposed on the illumination optical axis Ax2.

In the second condensing element 68, the S-polarized excitation light incident from the first retardation element 63 through the polarization separation layer 643 is focused onto the wavelength conversion device 69. In the present embodiment, similarly to the first condensing element 66, the second condensing element 68 is configured as a lens group having three lenses, but the number of lenses does not matter.

The wavelength conversion device 69 converts the incident excitation light into fluorescent light. This wavelength conversion device 69 includes a wavelength conversion element 691 and a rotating device 695.

The rotating device 695 out of these components is constituted by a motor and the like that rotates the wavelength conversion element 691 around the central axis thereof.

The wavelength conversion element 691 includes a substrate 692, a phosphor layer 693 and a reflection layer 694 located on the incident-side surface of excitation light on the substrate 692.

The substrate 692 is formed in a substantially circular shape when seen from the incident side of excitation light. This substrate 692 can be constituted of a metal, ceramics or the like.

The phosphor layer 693 is a wavelength conversion layer including a phosphor that emits fluorescent light (for example, fluorescent light having a peak wavelength in a wavelength region of 500 to 700 nm) which is excited by the incident excitation light.

A portion of the fluorescent light generated in this phosphor layer 693 is emitted to the second condensing element 68 side, and the other portion thereof is emitted to the reflection layer 694 side.

The reflection layer 694 is disposed between the phosphor layer 693 and the substrate 692, and reflects the fluorescent light, incident from the phosphor layer 693, to the second condensing element 68 side.

The fluorescent light emitted from such a wavelength conversion element 691 is non-polarized light. This fluorescent light is incident on the polarization separation layer 643 of the light separation device 64 through the second condensing element 68, passes through the polarization separation layer 643 through the illumination optical axis Ax2, and is incident on the uniformizing device 8.

In this manner, the P-polarized light of the excitation light which is emitted from the light source device 5 (light source portion 51) and is incident on the light separation device 64 passes through the second retardation element 65 and is diffused and reflected by the diffusion device 67. Thereafter, the P-polarized light is converted into S-polarized light by passing through the second retardation element 65 again, and is reflected to the uniformizing device 8 side by the light separation device 64.

On the other hand, the S-polarized light of the excitation light which is emitted from the light source device 5 and is incident on the light separation device 64 is subjected to wavelength conversion into fluorescent light by the wavelength conversion device 69, then passes through the light separation device 64 and is emitted to the uniformizing device 8 side.

That is, blue light which is a portion of the excitation light and fluorescent light (light having green light and red light contained therein) are synthesized by the light separation device 64, and are incident on the uniformizing device 8 as the white illumination light WL. Therefore, the light separation device 64 can also be referred to as a photosynthesis device.

Configuration of Uniformizing Device

The uniformizing device 8 has a function of aligning a polarization direction in addition to uniformizing illuminance within a plane intersecting the optical axis of light incident on each of the light modulating devices 34 (34R, 34G, and 34B) which are regions to be illuminated in the uniform illumination device 31. This uniformizing device 8 includes a first lens array 81, a second lens array 82, a polarization conversion element 83 and a superposition lens 84 which are disposed on the illumination optical axis Ax2.

The first lens array 81 has a configuration in which first lenses 811 are arranged in a matrix within a plane intersecting the illumination optical axis Ax2, and divide the incident illumination light WL into a plurality of partial fluxes of light.

The second lens array 82 has a configuration in which second lenses 821 corresponding to the first lenses 811 are arranged in a matrix within the plane intersecting the illumination optical axis Ax2. In this second lens array 82, the plurality of partial fluxes of light divided by each of the first lenses 811 are superposed on each of the light modulating devices 34 together with the superposition lens 84.

The polarization conversion element 83 is disposed between the second lens array 82 and the superposition lens 84, and aligns the polarization directions of the plurality of partial fluxes of light. The illumination light WL which is formed by the plurality of partial fluxes of light having the polarization directions aligned by this polarization conversion element 83 is incident on the color separation device 32 through the superposition lens 84.

Configuration of Light Source Device

Figure 3:
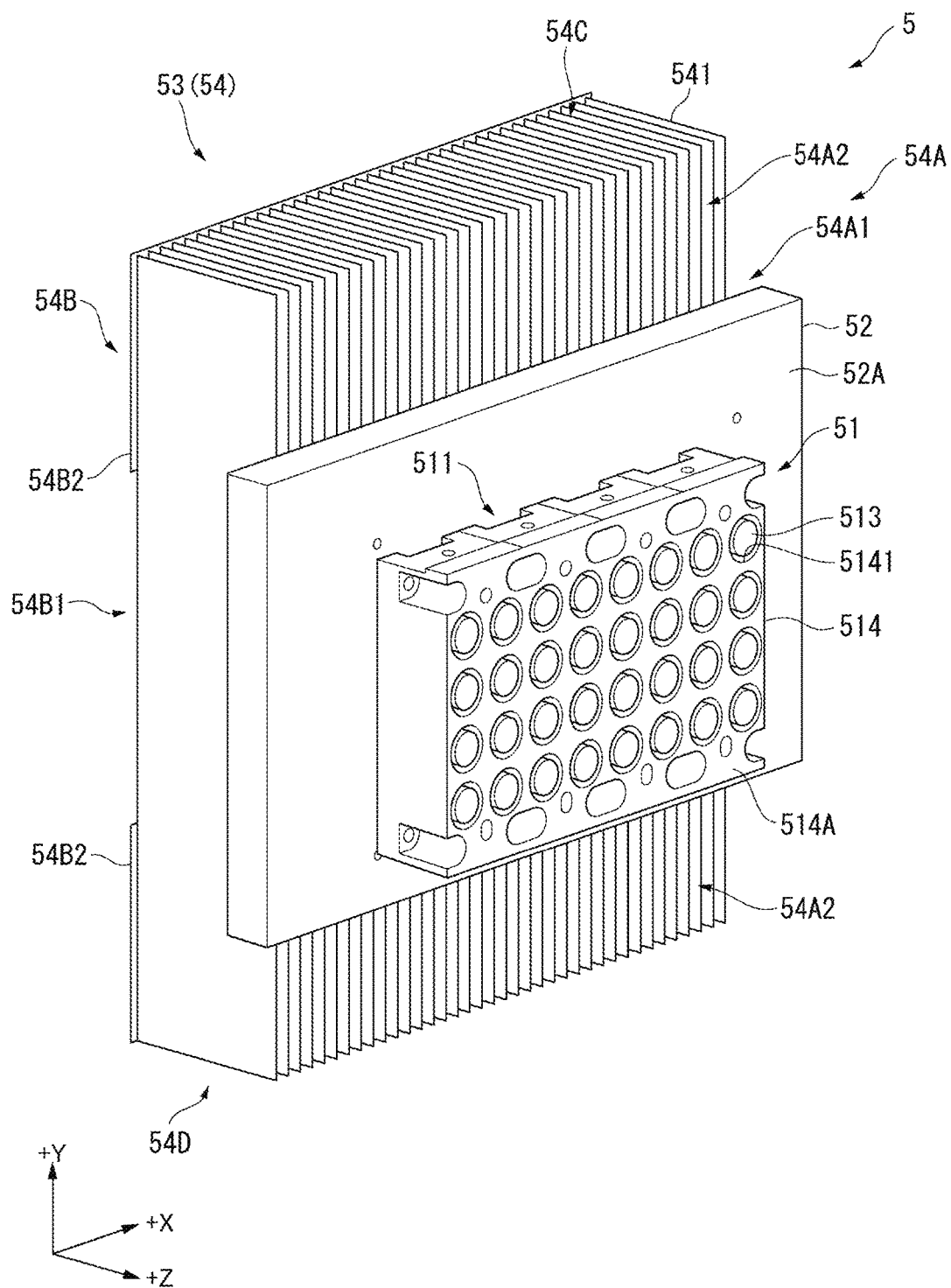
FIG. 3 is a perspective view when a light source device in the first embodiment is seen from the light emitting side.

FIG. 3 is a perspective view illustrating the light source device 5 when seen from the light emitting side. In FIG. 3, only some of the collimating lenses 513 and receiving portions 5141 are denoted by reference numerals and signs, in consideration of visibility, in addition to the omission of the cover member 55 constituting the heat dissipation portion 53.

As shown in FIG. 3, the light source device 5 includes the light source portion 51, the heat receiving portion 52 which is connected to a support member 514 of the light source portion 51, and the heat dissipation portion 53 which is connected to the heat receiving portion 52.

Configuration of Light Source Portion

Each light source portion 51 includes the substrate 511, the solid-state light source 512 and the collimating lens 513 which are described above, and further includes the support member 514 that supports these components in addition thereto.

The support member 514 is formed in a substantially rectangular shape, and includes a plurality of receiving portions 5141 which are substantially cylindrical hole portions in which the solid-state light source 512 (not shown in FIG. 3) and the collimating lens 513 are received one by one. These receiving portions 5141 are arranged on a rectangular surface 514A intersecting the illumination optical axis Ax1 in the support member 514 along the longitudinal direction and the short-side direction of the surface 514A. Thereby, the solid-state light source 512 and the collimating lens 513 received in each of the receiving portions 5141 are arranged in a matrix within a plane intersecting the illumination optical axis Ax1.

In addition, in the support member 514, the substrate 511 is disposed on the opposite side to the direction of emission of the excitation light from the solid-state light source 512.

Such a support member 514 is formed of a metal having thermal conductivity. For this reason, the support member 514 has a function of stably supporting the substrate 511, the solid-state light source 512 and the collimating lens 513, and also has a function of dissipating heat conducted by contacting these components, and conducting the heat to the heat receiving portion 52.

In the following description, the direction of travel of excitation light emitted from the light source portion 51 is set to a +Z direction, and two directions intersecting the +Z direction are set to a +X direction and a +Y direction. The +X direction out of these +X direction and +Y direction is set to one direction along the longitudinal direction of the surface 514A, and the +Y direction is set to one direction along the short-side direction of the surface 514A. More specifically, in a case where the surface 514A is seen so that the longitudinal direction of the surface 514A is set to a horizontal direction and the short-side direction thereof is set to a vertical direction, a direction which is directed from the left to the right is set to the +X direction, and a direction which is directed upward from below is set to the +Y direction. Even in a case where the surface 514A has shapes other than a rectangle, or a case where the solid-state light source 512 and the collimating lens 513 are randomly arranged, one of two directions intersecting the +Z direction and intersecting each other may be set to the +X direction, and the other may be set to the +Y direction.

In addition, the opposite direction of the +Z direction is set to a −Z direction. The same is true of a −X direction and a −Y direction.

The +Y direction is equivalent to a first direction according to the invention, the +Z direction is equivalent to a second direction according to the invention, and the +X direction is equivalent to a third direction according to the invention.

Configuration of Heat Receiving Portion

The heat receiving portion 52 is a flat plate-like member, having a substantially rectangular shape, formed of a material (for example, metal) with thermal conductivity, and is formed to be larger in dimensions in the +X direction and the +Y direction than the support member 514. A surface on the −Z direction side (surface on the opposite side to the surface 514A) in the support member 514 is thermally conductively connected to the substantially central portion of a surface 52A on the +Z direction side in this heat receiving portion 52 so that the longitudinal direction of the support member 514 is coincident with the longitudinal direction of the heat receiving portion 52. Thereby, the heat generated in the light source portion 51 is conducted to the heat receiving portion 52 through the support member 514.

Configuration of Heat Dissipation Portion

Figure 4:
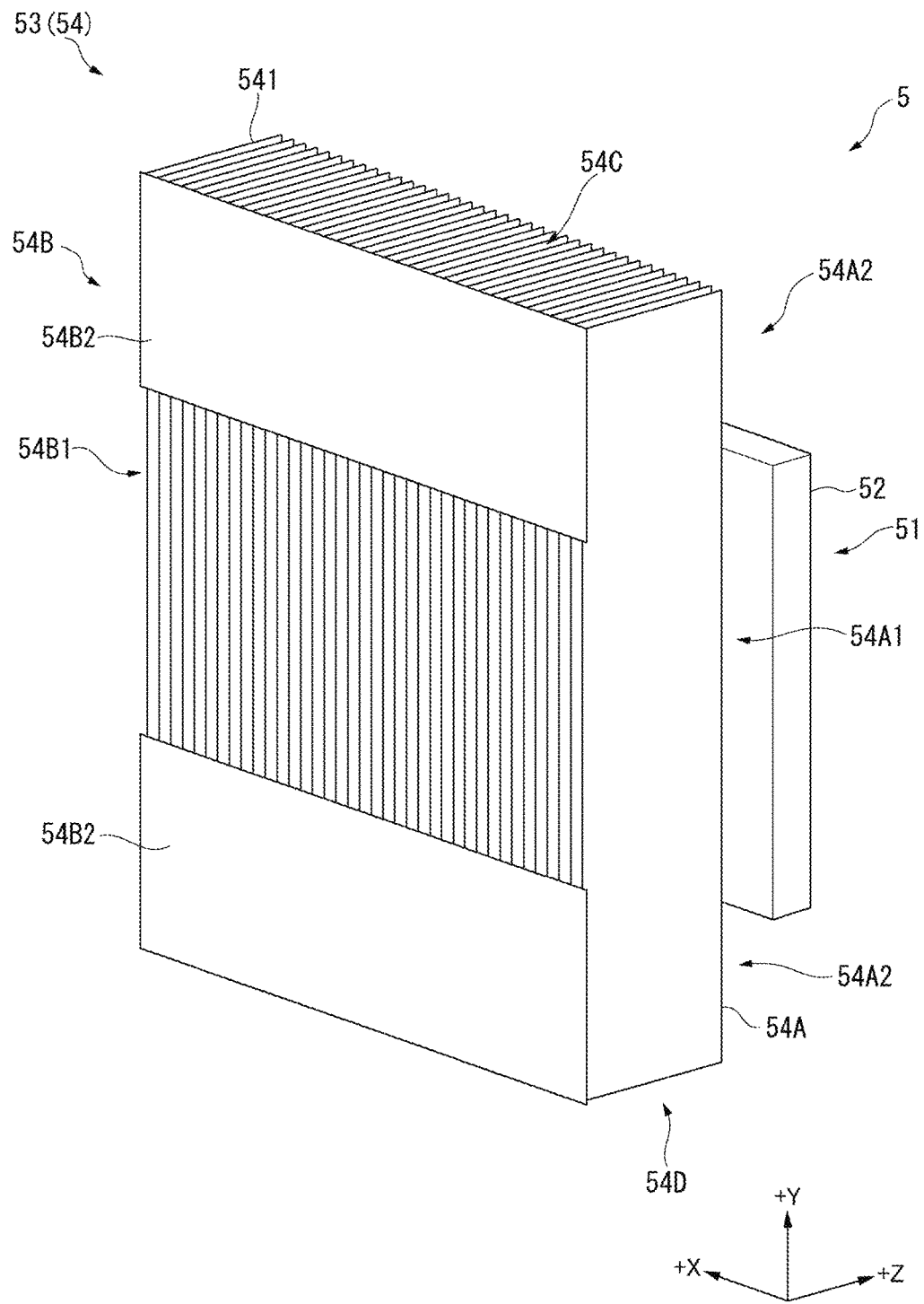
FIG. 4 is a perspective view when the light source device in the first embodiment is seen from the opposite side to the light emitting side.

FIG. 4 is a perspective view illustrating the light source device 5 when seen from the opposite side to the light emitting side. In FIG. 4, the cover member 55 constituting the heat dissipation portion 53 is not also shown.

The heat dissipation portion 53 which is thermally conductively connected to the heat receiving portion 52 dissipates heat conducted from the heat receiving portion 52 to a cooling gas sent by drive of a fan 72 described later, and thereby cools the heat receiving portion 52 and the light source portion 51.

As shown in FIGS. 3 and 4, this heat dissipation portion 53 includes a main body 54, and the cover member 55 (see FIGS. 5 and 6) for connecting the main body 54 to a duct 71 of the light source cooling device 7 described later.

Configuration of Main Body

The main body 54 is a so-called heat sink in which a plurality of plate-like bodies 541 along a YZ plane specified by the +Y direction and the +Z direction are disposed facing each other along the +X direction.

As shown in FIG. 4, this main body 54 includes an opening 54B1 and shielding portions 54B2 on an end face 54B on the −Z direction side (end face 54B to which the ends of the plurality of plate-like bodies 541 on the −Z direction side are connected).

The opening 54B1 is a portion to which a gap between the plate-like bodies 541 is exposed, and a portion in which a cooling gas sent from the −Z direction side is introduced into the main body 54. This opening 54B1 is formed throughout the entire region from the end of the end face 54B on the +X direction side to the end thereof on the −X direction side so that the cooling gas is sent to all the plate-like bodies 541. Such a opening 54B1 is located at a position corresponding to the heat receiving portion 52 when seen from the −Z direction side, and is located at the substantially central portion of the end face 54B in the +Y direction in the present embodiment. Specifically, when the heat dissipation portion 53 is seen from the −Z direction side, the opening 54B1 is positioned so that the central position of the opening 54B1 is substantially coincident with the central position of the heat receiving portion 52.

The shielding portions 54B2 which are located in the periphery of the opening 54B1 on the end face 54B shield a portion of the cooling gas sent from −Z direction side along the +Z direction, and guide the cooling gas into the main body 54 through the opening 54B1. In the present embodiment, the shielding portions 54B2 is portions other than the opening 54B1 on the end face 54B, and are located so that the opening 54B1 located at the substantially central portion of the end face 54B is interposed between the +Y direction side and the −Y direction side. In a case where the central position of the opening 54B1 shifts from the central position of the main body 54 to the +Y direction side or the −Y direction side when the heat dissipation portion 53 (main body 54) is seen from the −Z direction side, the dimension of each shielding portion 54B2 in the +Y direction can also change depending on the central position of the opening 54B1.

In the present embodiment, such a shielding portion 54B2 is formed by attaching a flat plate-like member to the end face 54B. However, without being limited thereto, the shielding portion may be formed by bending the end of each plate-like body 541 on the −Z direction side in the same direction (for example, +X direction).

In addition, as shown in FIGS. 3 and 4, the main body 54 includes a connecting portion 54A1 and discharge portions 54A2 on an end face 54A on the +Z direction side (end face 54A to which the ends of the plurality of plate-like bodies 541 on the +Z direction side are connected).

The connecting portion 54A1 is a site which is thermally conductively connected to the end face of the heat receiving portion 52 on the −Z direction side, and is located at the substantially central portion of the end face 54A in the +Y direction, in the present embodiment.

The dimension of this connecting portion 54A1 in the +Y direction is substantially coincident with the dimension of the heat receiving portion 52 in the +Y direction. Similarly to the shielding portion 54B2, such a connecting portion 54A1 may be configured by attaching a flat plate-like member, may be configured by bending each plate-like body 541, and may be a site which is neither added nor processed.

The discharge portions 54A2 are located at portions other than the connecting portion 54A1 on the end face 54A, and two discharge portions are provided so as to interpose the connecting portion 54A1 in the present embodiment. These discharge portions 54A2 are portions in which a gap between the plate-like bodies 541 along the +Y direction is exposed to the outside, and, in other words, are sites for discharging a cooling gas which is introduced into the main body 54 through the opening 54B1 and is sent to the connecting portion 54A1. These discharge portions 54A2 are disposed facing the inlet of the duct 71 described later, and the cooling gas discharged through the discharge portions 54A2 is introduced into the duct 71 through the inlet.

In the present embodiment, a gap between the respective plate-like bodies 541 is exposed to an end face 54C of the main body 54 on the +Y direction side and an end face 54D thereof on the −Y direction side, but these end faces 54C and 54D are blocked by being covered with the cover member 55 described later. However, without being limited thereto, the end faces 54C and 54D may be blocked by the attachment of a flat plate-like member, the bending of the plate-like body 541, or the like.

Configuration of Cover Member

Figure 5:
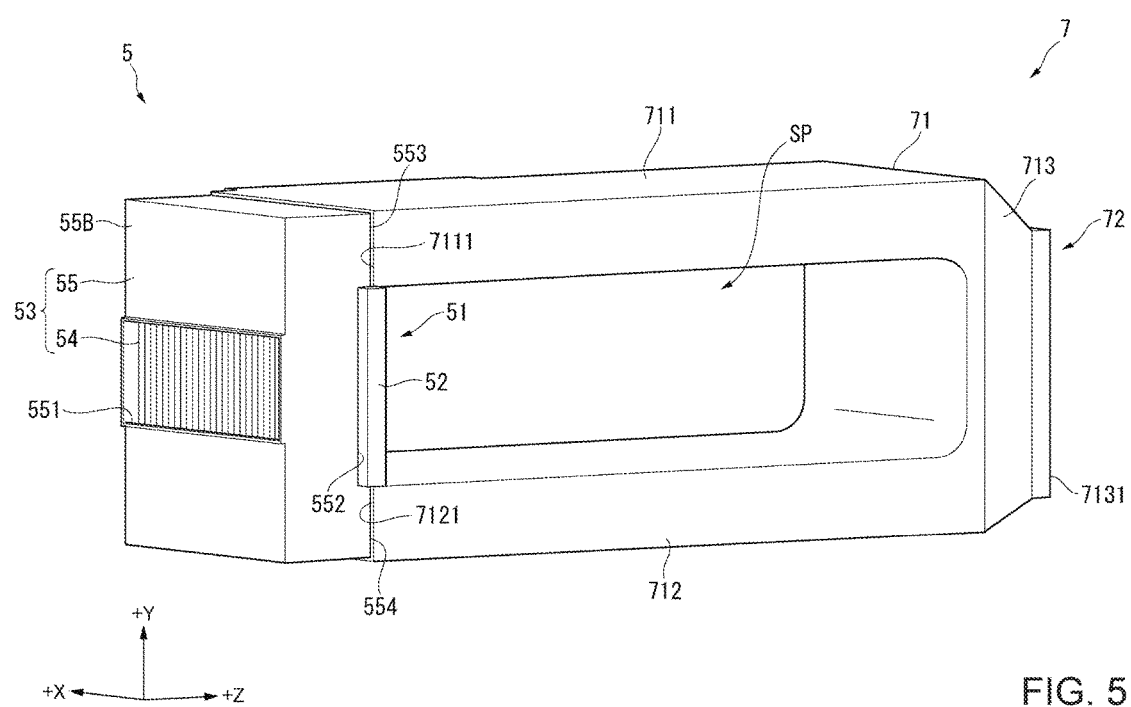
FIG. 5 is a perspective view when the light source device and a light source cooling device in the first embodiment are seen from the opposite side to the light emitting side.
Figure 6:
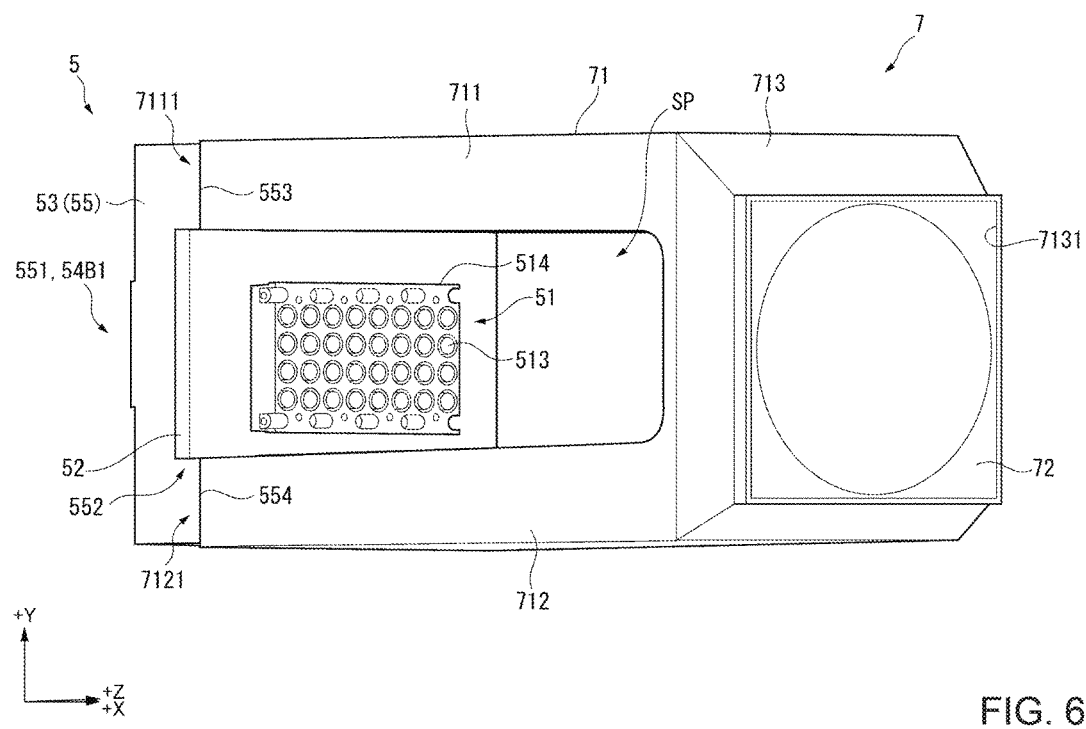
FIG. 6 is a perspective view when the light source device and the light source cooling device in the first embodiment are seen from the light emitting side.

FIGS. 5 and 6 are perspective views illustrating the light source device 5 and the light source cooling device 7. FIG. 5 of these drawings is a perspective view when the light source device 5 and the light source cooling device 7 are seen from the opposite side (−Z direction side) to the light emitting side of the light source device 5, and FIG. 6 is a perspective view when the light source device 5 and the light source cooling device 7 are seen from the light emitting side (+Z direction side).

As shown in FIGS. 5 and 6, the cover member 55 is a member that covers the main body 54 connected to the light source portion 51 and the heat receiving portion 52 from the −Z direction side, and is attached to the duct 71 constituting the light source cooling device 7.

As shown in FIG. 5, this cover member 55 is configured such that an opening 551 having the same shape and dimension as those of the opening 54B1 is formed at a position corresponding to the opening 54B1. The cover member 55 is configured such that portions other than the opening 551 on a surface 55B on the −Z direction side shield the cooling gas, and that the cooling gas does not flow from the portion other than the opening 551 into the cover member 55. From this, the portions other than the opening 551 can also be referred to shielding portions in the cover member 55.

In the end faces of the cover member 55 in the +X direction and the −X direction, a recess portion 552 is formed at a position on the +Z direction side, and the heat receiving portion 52 is fitted into the recess portion 552. For this reason, since a portion of heat conducted to the heat receiving portion 52 is directly conducted and dissipated to the cover member 55, and the cover member 55 is connected to the main body 54, a portion of heat conducted to the main body 54 is also dissipated by the cover member 55.

In addition, the cover member 55 includes a connecting portion 553 connected to a first duct portion 711 of the duct 71 and a connecting portion 554 connected to a second duct portion 712, at an end face on the +Z direction side and a position with the light source portion 51 and the heat receiving portion 52 interposed therebetween. In these connecting portions 553 and 554, openings, not shown, are formed at positions corresponding to the discharge portions 54A2. Thereby, the cooling gas discharged from the discharge portions 54A2 is discharged outside the heat dissipation portion 53 through the openings.

Configuration of Light Source Cooling Device

As described above, the light source cooling device 7 connected to the heat dissipation portion 53 of the light source device 5 sends a cooling gas to the heat dissipation portion 53, and cools the heat dissipation portion 53, the heat receiving portion 52 and the light source portion 51. This light source cooling device 7 includes the duct 71 and the fan 72 as shown in FIGS. 5 and 6.

The duct 71 includes the first duct portion 711 and the second duct portion 712 extending out along the +Z direction, and a merging portion 713 that connects these duct portions 711 and 712 and merges cooling gases sent within the duct portions 711 and 712, and is thereby formed in a substantially lateral U-shape when seen from the −X direction side. A housing (not shown) that houses the illumination light generation device 6 or a portion of the housing 328 for optical components of the color separation device 32 is disposed in a space SP between the first duct portion 711 and the second duct portion 712.

The end (end on the −Z direction side) of the first duct portion 711 on the opposite side to the merging portion 713 is configured as a connecting portion 7111 to which the connecting portion 553 is connected, and the end (end on the −Z direction side) of the second duct portion 712 on the opposite side to the merging portion 713 is configured as a connecting portion 7121 to which the connecting portion 554 is connected.

Though not shown in FIGS. 5 and 6, inlets 7112 and 7122 (see FIG. 7) for introducing a cooling gas discharged from the heat dissipation portion 53 through the discharge portion 54A2 and the opening into each of the duct portions 711 and 712 are formed in these connecting portions 7111 and 7121.

The merging portion 713 merges the cooling gases sent within the respective duct portions 711 and 712, and discharges the merged cooling gas outside of the duct 71. An outlet 7131 for discharging the cooling gas is formed at the end of this merging portion 713 on the +Z direction side, and the fan 72 is disposed within the outlet 7131.

The fan 72 suctions a cooling gas introduced into the heat dissipation portion 53 through the duct 71, and discharges the cooling gas from the outlet 7131.

Flow of Cooling Gas by Drive of Fan

Figure 7:
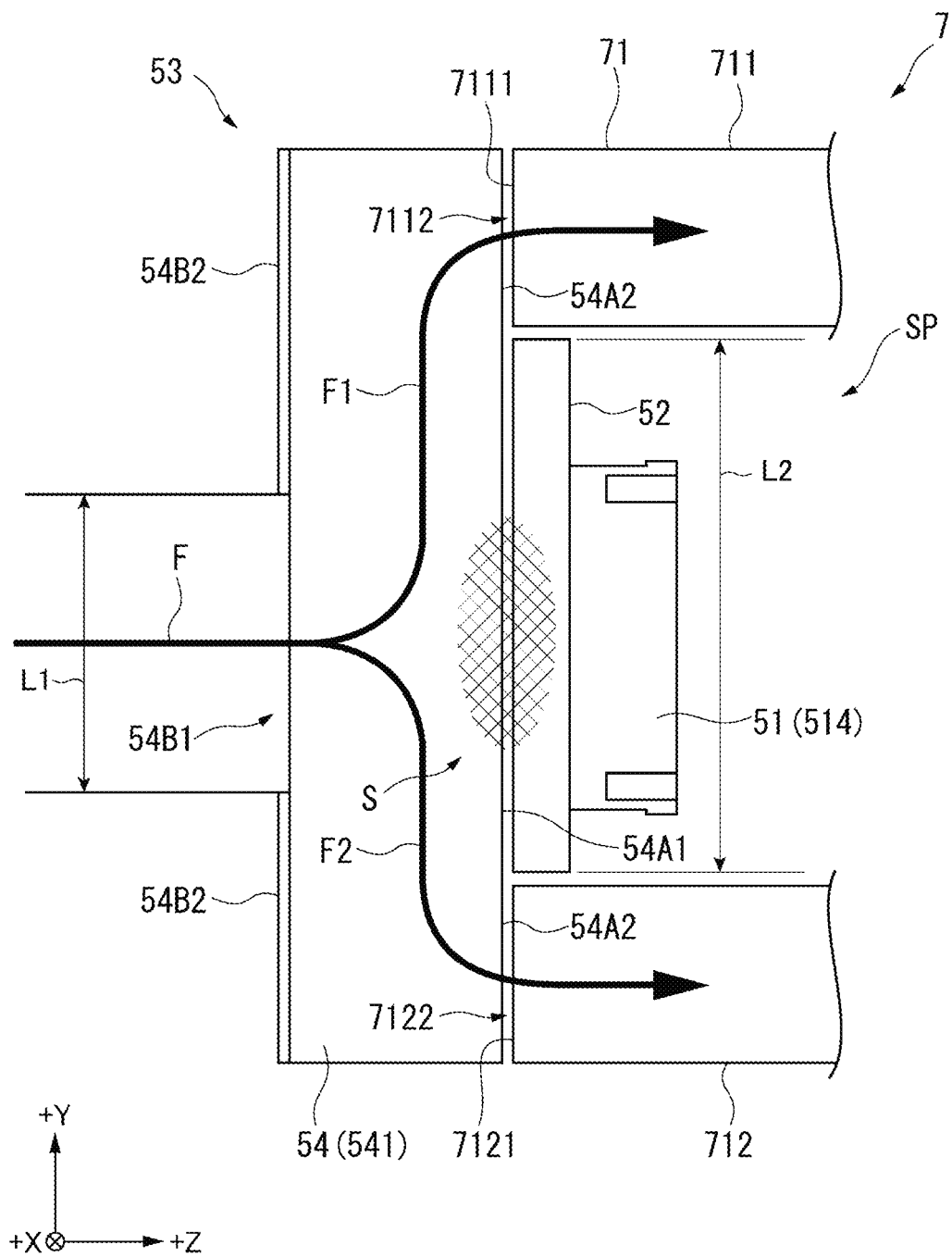
FIG. 7 is a schematic diagram illustrating a flow of a cooling gas which is sent to a heat dissipation portion and a duct in the first embodiment.

FIG. 7 is a schematic diagram illustrating a flow of a cooling gas sent to the heat dissipation portion 53 and the duct 71 when the fan 72 is driven. The cover member 55 is not shown in FIG. 7.

When the fan 72 is driven, as shown in FIG. 7, a cooling gas F outside the heat dissipation portion 53 is introduced into the heat dissipation portion 53, that is, the main body 54 through the openings 551 and 54B1. This cooling gas F travels in the +Z direction through a gap between the plate-like bodies 541, and reaches the connecting portion 54A1 which is located in the +Z direction with respect to the opening 54B1 and is connected to the heat receiving portion 52.

Here, a dimension L1 of the opening 54B1 in the +Y direction is equal to or less than a dimension L2 of the connecting portion 54A1 to which the heat receiving portion 52 is connected in the +Y direction, and the dimension L1 is smaller than the dimension L2 in the present embodiment. Further, the position of the opening 54B1 is set so that, when heat dissipation portion 53 (main body 54) is seen from the −Z direction side, the end edge of the opening 54B1 in the +Y direction is located closer to the end edge of the connecting portion 54A1 on the −Y direction side than that on the +Y direction side, and that the end edge of the opening 54B1 in the −Y direction is located closer to the end edge of the connecting portion 54A1 on the +Y direction side than that on the −Y direction side.

For this reason, the cooling gas F introduced into the heat dissipation portion 53 is sent to a site S of the connecting portion 54A1 corresponding to the heat receiving portion 52, and the connecting portion 54A1, the heat receiving portion 52 and the light source portion 51 are effectively cooled.

Thereafter, the cooling gas F sent to the site S is further suctioned by the fan 72, and a portion of a cooling gas F1 is sent in the +Y direction between the plate-like bodies 541, and the other cooling gas F2 is sent in the −Y direction between the plate-like bodies 541. In this case, heat conducted to the plate-like bodies 541 is conducted to the cooling gases F1 and F2. Thereby, the plate-like bodies 541 and the main body 54 are cooled.

The cooling gas F1 sent within the main body 54 in the +Y direction side through between the plate-like bodies 541 is introduced into the first duct portion 711 through the discharge portion 54A2 and the connecting portion 553. In addition, similarly, the cooling gas F2 sent to the −Y direction side within the main body 54 through between the plate-like bodies 541 is introduced into the second duct portion 712 through the discharge portion 54A2 and the connecting portion 554.

The cooling gases F1 and F2 introduced into these duct portions 711 and 712 are sent within the duct portions 711 and 712, respectively, in the +Z direction, reach the merging portion 713, and are discharged by the fan 72 through the outlet 7131 of the merging portion 713.

In this manner, the light source device 5 is cooled.

Effect of First Embodiment

According to the projector 1 of the present embodiment described above, the following effects are exhibited.

On the end face 54B of the main body 54 of the heat dissipation portion 53 on the −Z direction side, the shielding portions 54B2 that shield the cooling gas sent to the end face 54B and introduce the cooling gas into the main body 54 only through the opening 54B1 are located in the periphery of the opening 54B1. In addition, the opening 54B1 is located at a position corresponding to the connecting portion 54A1 to which heat of the heat receiving portion 52 is conducted when seen from the −Z direction side. According to this, the cooling gas introduced into the heat dissipation portion 53 (main body 54) through the openings 551 and 54B1 of the light source device 5 can be sent to the connecting portion 54A1 having an increase in temperature, at a shortest distance. Therefore, it is possible to efficiently cool the connecting portion 54A1, and to efficiently cool the heat receiving portion 52 and the light source portion 51.

As described above, the cooling gas sent into the heat dissipation portion 53 (main body 54) through the openings 551 and 54B1 is sent along the +Z direction between the plurality of plate-like bodies 541. According to this, as described above, the cooling gas can be reliably sent to the connecting portion 54A1 located on the +Z direction side with respect to the opening 551. Therefore, it is possible to efficiently cool the connecting portion 54A1, and to reliably efficiently cool the heat receiving portion 52 and the light source portion 51.

On the end face 54B of the main body 54 on the −Z direction side, the shielding portions 54B2 are located on the +Y direction side and the −Y direction side so as to interpose the opening 54B1 therebetween. According to this, it is possible to increase a flow channel in which the cooling gas introduced through the opening 54B1 is sent along between the plate-like bodies 541 in the +Y direction and the −Y direction. Therefore, it is possible to efficiently cool the plurality of plate-like bodies 541 to which heat is conducted from the connecting portion 54A1.

Here, in a case where the dimension of the opening 54B1 in the +Y direction is larger than the dimension of the connecting portion 54A1 to which heat is conducted from the heat receiving portion 52 in the +Y direction, a cooling gas which is not sent the connecting portion 54A1 has a tendency to occur, and the cooling efficiency of the connecting portion 54A1 decreases. On the other hand, the dimension L1 of the opening 54B1 in the +Y direction is smaller than the dimension L2 of the connecting portion 54A1 in the +Y direction which is substantially coincident with the dimension of the heat receiving portion 52 in the +Y direction. According to this, it is possible to reliably send the substantial entirety of the cooling gas introduced from the opening 54B1 to the connecting portion 54A1. Therefore, it is possible to further increase the cooling efficiency of the connecting portion 54A1, the heat receiving portion 52 and the light source portion 51.

The main body 54 constituting the heat dissipation portion 53 includes the discharge portions 54A2 that discharge the cooling gas sent to the connecting portion 54A1 to the outside, on the +Y direction side and the −Y direction side with respect to the connecting portion 54A1. According to this, the cooling gas having cooled the connecting portion 54A1 can be sent to the +Y direction side and the −Y direction side without delay. Therefore, since the cooling gas can be reliably sent along the plate-like bodies 541, it is possible to improve the cooling efficiency of these plate-like bodies 541, and the cooling efficiency of the heat receiving portion 52 and the light source portion 51. In addition, the cooling gas is circulatorily sent and discharged without delay in this manner, and thus the flow rate of the cooling gas can be increased. Therefore, in this point, it is also possible to improve the cooling efficiency of heat which is conducted through the connecting portion 54A1, and to improve the cooling efficiency of the heat receiving portion 52 and the light source portion 51.

The discharge portions 54A2 are located on the same end face 54A as that of the connecting portion 54A1 in the main body 54 of the heat dissipation portion 53. According to this, it is possible to suppress an increase in the dimension of the illumination device 4 in the +Y direction which includes the light source device 5, and the light source cooling device 7 having the duct 71 connected to the discharge portions 54A2 of the light source device 5.

Modification of First Embodiment

In the light source device 5 and the light source cooling device 7, the main body 54 of the heat dissipation portion 53 includes the discharge portions 54A2 on the +Y direction side and the −Y direction side at the end face 54A on the +Z direction side, and the heat dissipation portion 53 is connected to the first duct portion 711 and the second duct portion 712 by the connecting portions 553 and 554 located on the +Y direction side and the −Y direction side at the end face of the cover member 55 on the +Z direction side. However, the position of the connection between the heat dissipation portion 53 and the duct 71 may be other positions without being limited thereto.

Figure 8:
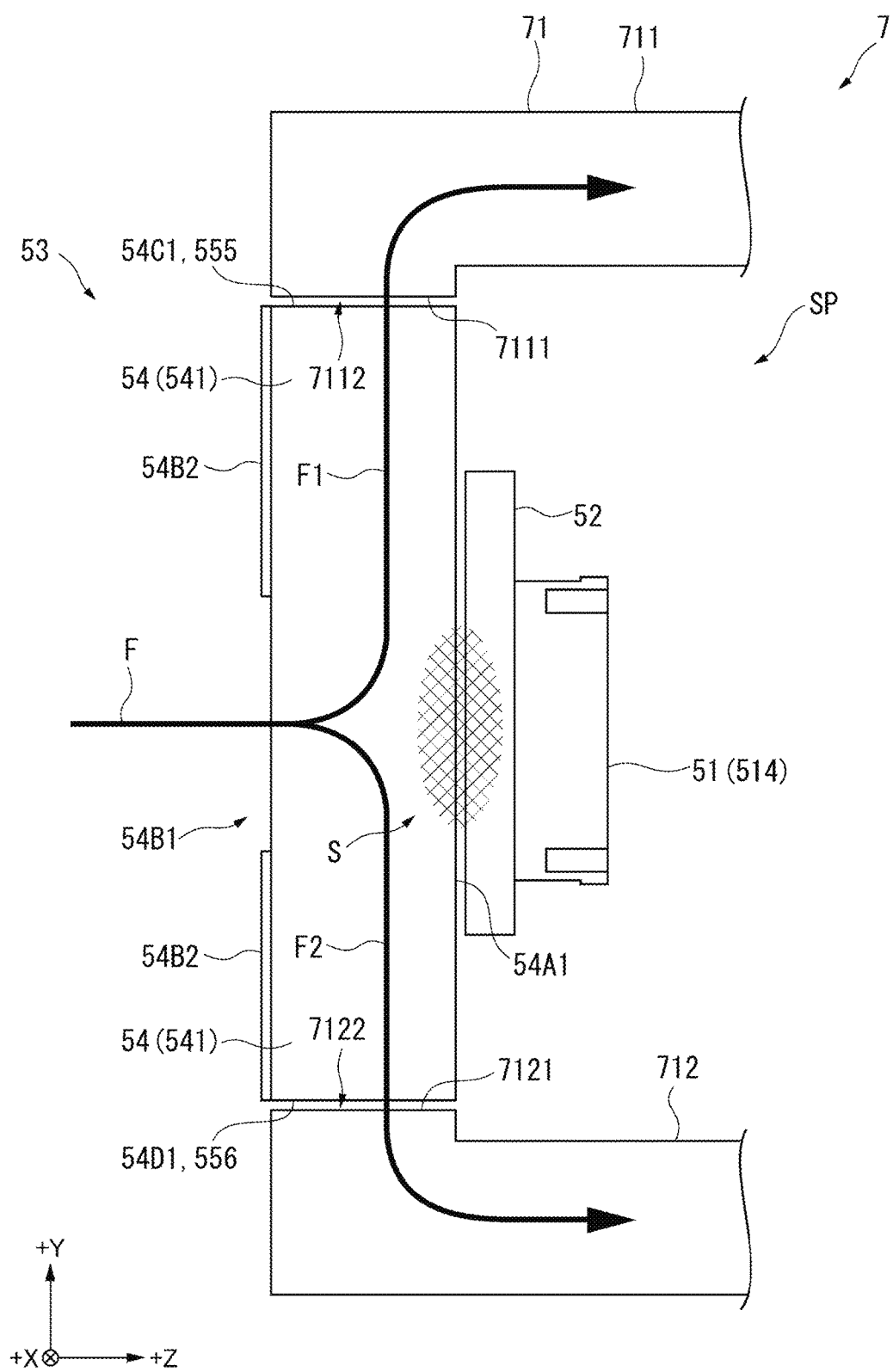
FIG. 8 is a schematic diagram illustrating modifications of the heat dissipation portion and the duct in the first embodiment.

FIG. 8 is a schematic diagram illustrating modifications of the heat dissipation portion 53 and the duct 71.

For example, the discharge direction of the cooling gas from the heat dissipation portion 53 may be set to the +Y direction and the −Y direction, as shown in FIG. 8, rather than to the +Z direction. In this case, sites in which the discharge portions 54A2 are set are blocked on the end face 54A of the main body 54, and the end faces 54C and 54D are opened. Thereby, discharge portions 54C1 and 54D1 that discharge a cooling gas are set at the end faces 54C and 54D. Similarly, in the cover member 55 that covers the main body 54, the same connecting portions 555 and 556 as the connecting portions 553 and 554 connected to the duct 71 are set at positions corresponding to the discharge portions 54C1 and 54D1.

On the other hand, the connecting portion 7111 included in the first duct portion 711 of the duct 71 is set in the vicinity of the end of the first duct portion 711 on the −Z direction side and at the site thereof on the −Y direction side, and the connecting portion 7121 included in the second duct portion 712 is set in the vicinity of the end of the second duct portion 712 on the −Z direction side and the site thereof on the +Y direction side.

When the heat dissipation portion 53 is connected to the duct 71 so that these connecting portions 7111 and 7121 and the discharge portions 54C1 and 54D1 face each other, and the fan 72 is driven, similarly to the above, the cooling gas F introduced into the main body 54 of the heat dissipation portion 53 travels in the +Z direction through a gap between the plate-like bodies 541, and reaches the site S in the connecting portion 54A1.

Thereafter, a portion of the cooling gas F1 is sent between the plate-like bodies 541 in the +Y direction, and flows into the first duct portion 711 through the connecting portions 555 and 7111 and the discharge portion 54C1 which is set at the end face 54C of the main body 54 on the +Y direction side. In addition, the other cooling gas F2 is sent between the plate-like bodies 541 in the −Y direction, and flows into the second duct portion 712 through the connecting portions 556 and 7121 and the discharge portion 54D1 which is set at the end face 54D of the main body 54 on the −Y direction side. Similarly to the above, the cooling gases F1 and F2 introduced into these duct portions 711 and 712 are sent within the duct portions 711 and 712, respectively, in the +Z direction, and are discharged by the fan 72 through the outlet 7131 of the merging portion 713.

According to the illumination device 4 including the light source device 5 and the light source cooling device 7 as described above, it is possible to exhibit the same effect as that stated above, and to send a cooling gas to the entire surfaces of the plate-like bodies 541 along the +Y direction. Therefore, it is possible to improve the cooling efficiency of each of the plate-like bodies 541, and to improve the cooling efficiency of the heat receiving portion 52 and the light source portion 51.

Second Embodiment

Next, a second embodiment of the invention will be described.

A projector according to the present embodiment has the same configuration as that of the projector 1, but is different from the projector 1, in that two light source devices 5 are provided, and that these two light source devices 5 are connected to one duct. In the following description, the same or substantially same components as the components having previously described are denoted by the same reference numerals and signs, and thus the description thereof will not be given.

Figure 9:
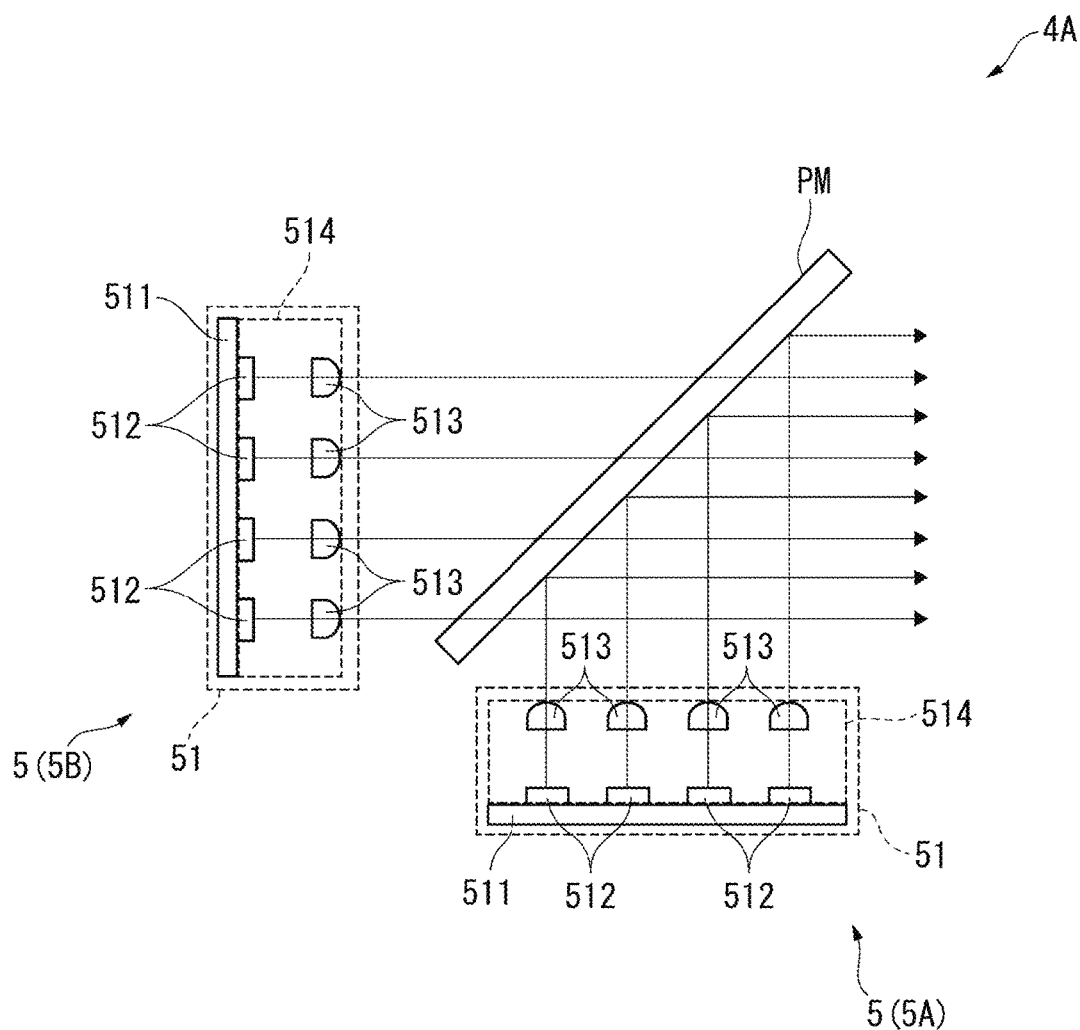
FIG. 9 is a schematic diagram illustrating a portion of an illumination device included in a projector according to a second embodiment of the invention.
Figure 10:
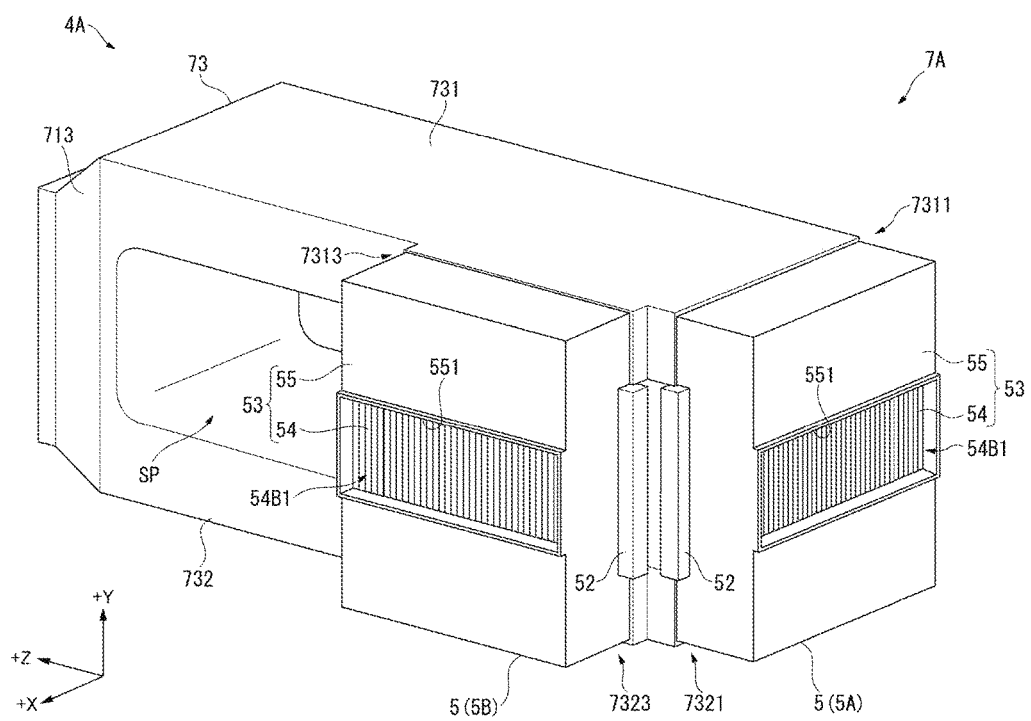
FIG. 10 is a perspective view illustrating light source devices and a light source cooling device which are included in the illumination device in the second embodiment.

FIG. 9 is a schematic diagram illustrating a portion of an illumination device 4A included in the projector according to the present embodiment. In addition, FIG. 10 is a perspective view illustrating light source devices 5A and 5B and a light source cooling device 7A which are included in the illumination device 4A. Further, FIG. 11 is a perspective view illustrating the light source devices 5A and 5B and the light source cooling device 7A in which the cover member 55 is removed from a state shown in FIG. 10.

The projector according to the present embodiment has the same configuration and function as those of the projector 1, except that an illumination device 4A is included instead of the illumination device 4.

Figure 11:
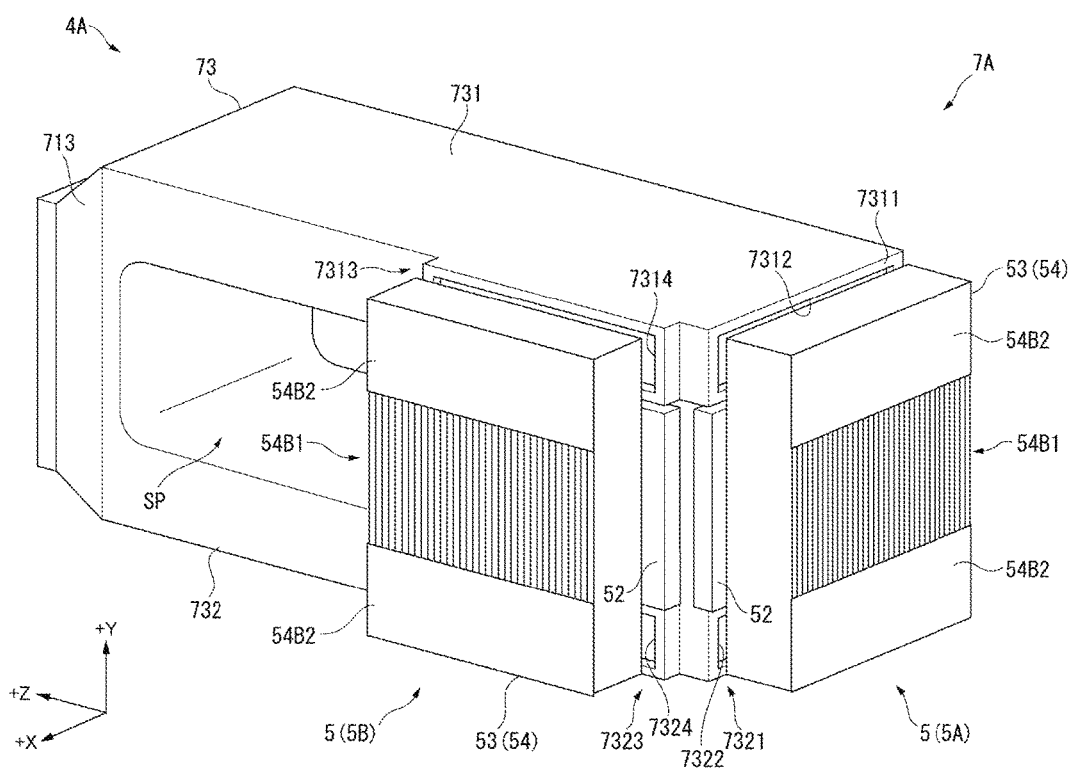
FIG. 11 is a perspective view illustrating the light source devices and the light source cooling device in the second embodiment.

In addition, the illumination device 4A includes two light source devices 5 (5A and 5B) and a photosynthesis member PM as shown in FIG. 9, further includes a light source cooling device 7A instead of the light source cooling device 7 as shown in FIGS. 10 and 11, and has the same configuration and function as those of the illumination device 4.

Configuration of Light Source Cooling Device

As shown in FIGS. 10 and 11, the light source cooling device 7A includes a duct 73 instead of the duct 71, and has the same configuration as that of the light source cooling device 7.

Similarly to the duct 71, the duct 73 includes a first duct portion 731 and a second duct portion 732 extending out along the +Z direction, and the merging portion 713 that connects the duct portions 731 and 732 on the +Z direction side and merges a cooling gas sent within these duct portions 731 and 732 to discharge the cooling gas.

As shown in FIGS. 9 and 10, similarly to the duct portions 711 and 712, the ends of the first duct portion 731 and the second duct portion 732 on the −Z direction side are configured as connecting portions 7311 and 7321 which are connected to the connecting portions 553 and 554 of the light source device 5A.

In addition, at sites on the −Z direction side of the end faces of the respective duct portions 731 and 732 on the +X direction side, connecting portions 7313 and 7323 which are connected to the connecting portions 553 and 554 of the light source device 5B are provided so as to protrude from the end faces in the +X direction.

As shown in FIG. 10, these connecting portions 7311 and 7321 have inlets 7312 and 7322 formed at positions facing the discharge portions 54A2 of the light source device 5A, and the connecting portions 7313 and 7323 have inlets 7314 and 7324 formed at positions facing the discharge portions 54A2 of the light source device 5B.

The light source devices 5A and 5B attached to such a duct 73 are disposed so that the directions of emission of excitation light intersect each other. As shown in FIG. 9, the photosynthesis member PM is disposed so as to face each of the light source devices 5A and 4B. One of these light source devices 5A and 5B is disposed on the illumination optical axis Ax1.

This photosynthesis member PM transmits excitation light emitted from one light source device of the light source devices 5A and 5B along the illumination optical axis Ax1, and reflects excitation light emitted from the other light source device along the illumination optical axis Ax1, to thereby synthesize these beams of excitation light. The excitation light through such a photosynthesis member PM is incident on the afocal optical system 61.

Flow of Cooling Gas

In the light source cooling device 7A shown in FIGS. 10 and 11, when the fan 72 located within the merging portion 713 is driven, a cooling gas flows into the heat dissipation portion 53 through the openings 551 and 54B1 of the light source devices 5A and 5B. As described above, this cooling gas is sent between the plate-like bodies 541 of the main body 54, and reaches the site S of the connecting portion 54A1 which is connected to the heat receiving portion 52. Thereafter, a portion of the cooling gas is sent to the +Y direction side, and the other cooling gas is sent to the −Y direction side.

The cooling gas sent to the +Y direction side in the light source device 5A flows into the first duct portion 731 through the discharge portion 54A2 and the connecting portions 553 and 7311, and the cooling gas sent to the −Y direction side flows into the second duct portion 732 through the discharge portions 54A2 and the connecting portions 554 and 7321.

The cooling gas sent to the +Y direction side in the light source device 5B flows into the first duct portion 731 through the discharge portions 54A2 and the connecting portions 553 and 7313, and the cooling gas sent to the −Y direction side flows into the second duct portion 732 through the discharge portions 54A2 and the connecting portions 554 and 7323.

The cooling gases having flowed into these respective duct portions 731 and 732 are merged in the merging portion 713, and are discharged from the outlet 7131 to the outside by the fan 72.

Effect of Second Embodiment

According to the projector of the present embodiment described above, the same effect as that of the projector 1 can be exhibited, and the following effects can be exhibited in addition thereto.

The light source device 5A is disposed so that the excitation light emitted from the light source portion 51 travels in the +Z direction, and the light source device 5B is disposed so that the excitation light emitted from the light source portion 51 travels in the −X direction. The plate-like body 541 included in the light source device 5A is along a YZ plane, and the plate-like body 541 included in the light source device 5B is along an XY plane. That is, even in a case where the plate-like bodies 541 of the respective light source devices 5A and 5B are extended in the +Y direction or the −Y direction, the plate-like bodies do not interfere with the respective light source devices 5A and 5B.

According to this, these light source devices 5A and 5B can be disposed adjacent to each other so that the plate-like bodies 541 of the respective light source devices 5A and 5B do not interfere with each other. Therefore, it is possible to suppress an increase in the size of the illumination device 4A due to the two light source devices 5A and 5B being provided.

The illumination device 4A includes the light source devices 5A and 5B, and the photosynthesis member PM that synthesizes beams of light emitted from these light source devices 5A and 5B. According to this, it is possible to use the beams of light emitted from these light source devices 5A and 5B as one flux of light, and to increase the amount of light to be emitted as compared to the illumination device 4 including one light source device 5. Therefore, it is possible to form and project an image having higher luminance.

Modification of Embodiment

The invention is not limited to the embodiments, and modifications, improvements and the like within a range capable of achieving the object of the invention are included in the invention.

The heat dissipation portion 53 is configured to include a main body 54 which is a heat sink, and the cover member 55 that covers the main body 54 and attaches the main body 54 to the ducts 71 and 73. However, the invention is not limited thereto. For example, in a case where the main body 54 can be attached directly to the ducts 71 and 73 or the like, the cover member 55 may not be provided. In this case, for example, in a case where the heat dissipation portion 53 (main body 54) is connected so that the discharge portion 54A2 and the connecting portions 7111, 7121, 7311, 7313, 7321, and 7323 of the ducts 71 and 73 face each other, the end faces 54C and 54D in the main body 54 may be blocked.

When the heat dissipation portion 53 is seen from the −Z direction side, the opening 54B1 is located at the substantial center of the end face 54B in the +Y direction, and the shielding portion 54B2 is disposed so as to interpose the opening 54B1 on the +Y direction side and the −Y direction side. In addition, the opening 551 is formed in accordance with the opening 54B1. However, the invention is not limited thereto. That is, the positions of the openings 54B1 and 551 may be any position within the surfaces of the main body 54 and cover member 55 on the −Z direction side, and the position of the shielding portion 54B2 may also be any position as long as the position is located in the periphery of the opening 54B1. The term "periphery" as used herein refers to a position which is connected to the end edge of the opening 54B1, and may not necessarily surround the opening 54B1. In addition, as described above, in a case where the shielding portion 54B2 is located on the +Y direction side and the −Y direction side with respect to the opening 54B1, the dimensions of the respective shielding portions 54B2 in the +Y direction may be different from each other, and may be the same as each other.

The dimension L1 of the opening 54B1 in the +Y direction is set to be smaller than the dimension L2 of the heat receiving portion 52 and the connecting portion 54A1 in the +Y direction. However, the invention is not limited thereto. That is, in a case where the cooling gas introduced into the main body 54 through the opening 54B1 can be sent to the connecting portion 54A1 (particularly, site S), the dimension L1 may be the same as the dimension L2, and may be larger than the dimension L2. In addition, in a case where the direction of sending a cooling gas to the heat dissipation portion 53 is inclined to the +Y direction side or the −Y direction side, or the +X direction side or the −X direction side with respect to the +Z direction, such as a case where the fan discharges a cooling gas to the heat dissipation portion 53 (main body 54), the position of the opening 54B1 may shift with respect to the connecting portion 54A1 in the direction of sending the cooling gas.

The cooling gas introduced into the main body 54 and sent to the connecting portion 54A1 is discharged outside of the main body 54 through the discharge portions 54A2 or the discharge portions 54C1 and 54D1 which are located on the +Y direction side and the −Y direction side with respect to the connecting portion 54A1. However, the invention is not limited thereto. For example, only one of the discharge portions 54A2, 54C1, and 54D1 may be configured to be provided in the main body 54. In this case, the opening 54B1 may be configured to be located at an end on the opposite side to the one discharge portion on the end face 54B. Further, in a case where the duct is connected to the end face 54B, the discharge portion may be located on the end face 54B. That is, the discharge portion may be located anywhere in the main body 54.

The ducts 71 and 73 which are connected to the light source device 5 are formed in a substantially lateral U-shape as described above. However, the invention is not limited thereto. For example, the ducts can be appropriately changed depending on the number of discharge portion 54A2 and the positions thereof. In addition, a duct, connected to the openings 551 and 54B1, which guides a cooling gas, and a fan that sends out a cooling gas into the duct may be adopted instead of or in addition to the ducts 71 and 73 and the fan 72 of the light source cooling devices 7 and 7A. In addition, without providing the ducts 71 and 73, a flow channel of the cooling gas having cooled the light source device 5 may be formed a space between the inner surface of the exterior housing 2 of the projector 1 and the outer surface of a housing (not shown) that houses the illumination light generation device 6 or the outer surface of the housing 328 for optical components.

The projector 1 includes three light modulating devices 34 (34R, 34G, and 34B) having a liquid crystal panel. However, the invention is not limited thereto. That is, the invention can also be applied to a projector using two or less, or four or more light modulating devices.

In addition, the light modulating device 34 has a transmission-type liquid crystal panel used therein of which the light flux incident surface and the light flux emission surface are different from each other, but may have a reflection-type liquid crystal panel used therein of which the light incident surface and the light emission surface are the same as each other. In addition, in a case of a light modulating device capable of forming an image based on image information by modulating a flux of incident light, a device using a micromirror, for example, a light modulating device other than a liquid crystal such as a device using a digital micromirror device (DMD) may be used.

Further, respective optical components constituting the image projection device 3 may be otherwise arranged without being limited to the arrangement shown in FIGS. 1 and 2.

In each of the embodiments, the light source device 5 includes the light source portion 51 having the solid-state light source 512 which is an LD. However, the invention is not limited thereto. For example, a light source portion having other solid-state light sources such as an LED may be adopted, and a light source portion having a light source lamp may be adopted.

In addition, in each of the embodiments, examples of optical components constituting the illumination devices 4 and 4A include the afocal optical system 61, the homogenizer optical system 62, the first retardation element 63, the light separation device 64, the second retardation element 65, the first condensing element 66, the diffusion device 67, the second condensing element 68 and the wavelength conversion device 69. However, the invention is not limited thereto. That is, the functions and configurations of the optical components can be appropriately changed depending on the use of the illumination device having the light source device 5.

Further, in each of the embodiments, an example has been illustrated in which the light source device 5 and the illumination devices 4 and 4A according to the invention are applied to the projector 1. However, the invention is not limited thereto. For example, the light source device according to the invention may be used in illumination appliances and headlights of an automobile or the like.

What is claimed is:

1. A light source device comprising:
    a light source portion that emits light;
    a heat receiving portion that receives heat generated in the light source portion; and
    a heat dissipation portion that dissipates heat conducted from the heat receiving portion,
    wherein the heat dissipation portion includes
    a plurality of plate-like bodies that extend out along a plane which is specified by a first direction and a second direction intersecting the first direction, and are disposed facing each other in a third direction intersecting the first direction and the second direction,
    a connecting portion which is located on the second direction side in the plurality of plate-like bodies, and is connected to the heat receiving portion,
    an opening which is located on an opposite side to the second direction in the heat dissipation portion, and a position corresponding to the connecting portion, and
    a shielding portion which is located on an opposite side to the second direction in the heat dissipation portion, and in the periphery of the opening.

2. The light source device according to claim 1, wherein a cooling gas sent into the heat dissipation portion through the opening is sent between the plurality of plate-like bodies along the second direction.

3. The light source device according to claim 1, wherein the shielding portion is located on at least any of a site on the first direction side in a surface of the heat dissipation portion on the opposite side to the second direction and a site on an opposite side to the first direction.

4. The light source device according to claim 1, wherein a dimension of the opening in the first direction is equal to or less than a dimension of the connecting portion in the first direction.

5. The light source device according to claim 1, wherein the heat dissipation portion includes a discharge portion that discharges a cooling gas, to an outside, which is sent to at least any of the first direction side and the opposite side to the first direction with respect to the connecting portion.

6. The light source device according to claim 5, wherein the discharge portion is located on the same surface as a surface of the heat dissipation portion on which the connecting portion is located.

7. The light source device according to claim 5, wherein the discharge portions are located at an end face of the heat dissipation portion on the first direction side and an end face thereof on the opposite side to the first direction, respectively.

8. An illumination device comprising:
    the light source device according to claim 1;
    a duct in which at least any of a cooling gas sent to the heat dissipation portion and a cooling gas having cooled the heat dissipation portion is sent thereinto;
    a fan, provided in the duct, which sends a cooling gas to the heat dissipation portion; and
    a plurality of optical components that act on light emitted from the light source device.

9. The illumination device according to claim 8, further comprising:
    two light source devices; and
    a photosynthesis member that synthesizes beams of light emitted from the two light source devices.

10. A projector comprising:
    the illumination device according to claim 8;
    a light modulating device that modulates light emitted from the illumination device; and
    a projection optical device that projects light modulated by the light modulating device.

* * * * *